Patented Oct. 3, 1950

2,524,479

UNITED STATES PATENT OFFICE 2,524,479

PREPARATION OF PYRIMIDINES AND PYRIDINES

John C. Sauer, Wilmington, and William Kenneth Wilkinson, New Castle, Del., assignors to E. I. du Pont de Nemours & Company, Wilmington, Del., a corporation of Delaware No Drawing. Application July 21, 1949, Serial No. 106,094

15 Claims. (Cl. 260—251)

This invention relates to a new synthesis of heterocyclic nitrogen-containing compounds, particularly pyrimidines and pyridines.

Pyrimidines have been known for a long time; in fact, many physiologically important compounds contain the pyrimidine nucleus. With the exception of the 4-aminopyrimidines, which are readily obtainable by trimerizing nitriles in the presence of sodium alcoholates, no commercially attractive synthesis of the pyrimidines is known. The best known method for the preparation of the pyrimidines, other than the 4-aminopyrimidines, involves the reaction of amidines with beta-diketones or beta-ketonic acids. A new route to the pyrimidines, particularly the hydrocarbon-substituted pyrimidines, from cheap raw materials is therefore a desired goal. This is also true of the pyridines, for their separation from coal tar and bone tar is no easy task and yields only a few individual pyridines.

It is an object of this invention to provide a nivel process for the preparation of heterocyclic nitrogen-containing compounds, particularly pyrimidines and pyridines. A further object is to provide a process for preparing pyrimidines and pyridines, particularly hydrocarbon-substituted pyrimidines and pyridines from relatively inexpensive raw materials. Other objects will appear hereinafter.

These objects are accomplished by the following invention of a process which comprises reacting a monoacetylene with a mononitrile in the presence of an alkali metal. It has now been discovered that heterocyclic ring compounds containing carbon and nitrogen in said ring, such as pyrimidines and pyridines, can be prepared by reacting a monoacetylene with a mononitrile in the presence of an alkali metal catalyst, such as potassium or sodium.

The reactions by which six-membered heterocyclic ring compounds containing in said ring solely carbon and from one to two nitrogen atoms, that is the pyrimidines and pyridines, are formed are illustrated for acetylene and benzonitrile in the following equations:

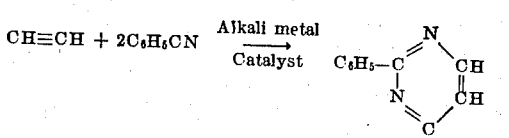

2,4-diphenylpyrimidine

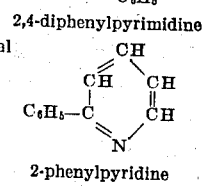

2-phenylpyridine

A convenient method for carrying out the process of this invention comprises passing the acetylene under moderate pressure, e. g., 100–300 lbs./sq. in., into an autoclave containing the nitrile and an alkali metal heated to 125–225° C. After several hours heating under this temperature and pressure, the autoclave is cooled, excess acetylene is bled off, and the contents of the autoclave subjected to fractional distillation to separate the pyrimidine, pyridine or both from unreacted nitrile.

The process is illustrated more fully in the following examples in which parts are given by weight unless otherwise noted.

Example I

A pressure bomb was charged with 156 parts of acetonitrile and 2 parts of metallic potassium. The bomb was closed, cooled with solid carbon dioxide, evacuated and pressured to 100 lbs./sq. in. with acetylene. The bomb was then heated at 175–200° C. and the acetylene pressure maintained at 230–250 lbs./sq. in. After seven hours the bomb was cooled, the pressure released and the bomb opened. On distilling the reaction mixture 71 parts of acetonitrile was recovered and 12.5 parts of material boiling at 43–135° C. at 9–12 mm. was obtained. On careful refractionation the latter product gave 9 parts of 2,4-dimethylpyrimidine boiling at 37–41° C./13 mm.

The 2,4-dimethylpyrimidine was identified by comparison with an "authentic" sample of this compound prepared according to the method of Schmidt, Ber. 35, 1577 (1902). Data for the two samples are reported below:

| Property | Schmidt Method | Product of Example I |
|---|---|---|
| Boiling Point | 149–151° C | 150–1° C. |
| Odor | Like acetamide | Like acetamide. |
| Refractive index ($n_D^{25}$) | 1.4873 | 1.4880. |
| C:H:N Analysis | 66.5; 7.4; 25.9 (Calc.) | 66.3; 7.6; 25.8. |
| Picrate, M. P | 137–140.5° C | 137–140.5° C. |
| Picrate, mixed M. P | 140–1° C | 140–1° C. |
| Dibenzal derivative, M. P | 143–4° C | 142–3° C. |
| Dibenzal derivative, mixed M. P. | 141–3° C | 141–3° C. |
| Neutral Equivalent | 108 (Calc.) | 112. |

Example II

Using the procedure outlined in Example I, 100 parts isobutyronitrile and 1 part metallic potassium were reacted with acetylene for 16 hours at 125–200° C. at an acetylene pressure of 250–280 lbs./sq. in. The dark-colored reaction mixture was filtered and the filtrate distilled. There was obtained 33 parts of unreacted isobutyronitrile and 5 parts of a fraction distilling at 76–85° C./15 mm., $n_D^{25}$ 1.4743. Analyses of this fraction indicated it to be 2,4-diisopropylpyrimidine.

*Anal.*—Calcd. for $C_{10}H_{16}N_2$: C, 73.2; H, 9.8; N, 17.0. Found: C, 73.3; H, 10.3; N, 16.6.

The product from a similar run was found to boil at 74–77° C./11 mm. and have a refractive index ($n_D^{25}$) of 1.4730. This sample was converted into the picrate. Analysis of the picrate gave the following results.

*Anal.*—Calcd. for $C_{16}H_{19}O_7N_5$: C, 48.8; H, 4.8; N, 17.8. Found: C, 49.1; H, 4.9; N, 18.0; N. E. calcd., 164: found, 167.2.

Example III

In a pressure bomb 125 parts benzonitrile and 2 parts potassium catalyst were treated with acetylene at an acetylene pressure of 140–220 lbs./sq. in. and a temperature of 180–200° C. for about 13 hours. On distillation the reaction mixture gave 50 parts of a liquid boiling at 190–4° C./3 mm., $n_D^{25}$ 1.6643. This material slowly crystallized to a yellow solid, M. P. 58–9° C. The following analysis of this solid indicated it to be 2,4-diphenylpyrimidine.

*Anal.*—Calcd. for $C_{16}H_{12}N_2$: C, 82.8; H, 5.2; N, 12.0. Found: C, 83.0; H, 5.3; N, 11.7.

Example IV

Acetylene was introduced under a pressure of 180–220 lbs./sq. in. into a pressure vessel containing 125 parts of benzonitrile and 2 parts of metallic sodium heated to 180–181° C. After 8.6 hours reaction at this temperature, the reaction mixture was worked up by distillation. This yielded 16.1 parts of 2,4-diphenylpyrimidine boiling at 204° C./7 mm. ($n_D^{25}$ 1.6678) and melting at 58–59° C.

Example V

A shaker bomb containing 200 parts benzonitrile and 2 parts potassium was pressured with acetylene to 190–235 lbs./sq. in. for 6.2 hours while the temperature was maintained at 170–180° C. On cooling, the contents of the bomb were combined with that from a duplicate run and subjected to distillation with the following results:

|   | Parts |
|---|---|
| (1) ... 119° C./20 mm | 35 |
| (2) 119–141° C./8–9 mm | 8 |
| (3) 141° C./8–9 mm | 3 |
| (4) 195–200° C./2–4 mm | 130 |

Fraction (4) consisted of 2,4-diphenylpyrimidine. Fractions (1), (2) and (3) were combined and redistilled. This gave 7 parts of alpha-phenylpyridine boiling at 142–145.5° C./13 mm. (3 parts were collected at 142–143.5° C. and 4 parts at 143.5–145.5° C., with refractive indices $n_D^{25}$ 1.6144 and 1.6149, respectively).

The alpha-phenylpyridine was identified by comparison with an authentic sample prepared by the known method from phenyl magnesium bromide and pyridine. Data for the two samples are given below.

|   | "Authentic" | Example V |
|---|---|---|
| Boiling point | 143–7°/14 mm | 142–142.5°/13 mm. |
| $n_D^{25}$ | 1.6147 | 1.6144 |
| C, H, N Analysis | 85.1; 5.8; 9.1* | 84.0; 6.0; 10.5 |
| Picrate M. P. | 170–2 | 172–172.5 |
| Mixed M. P. picrate | 171–2 | 171–2 |
| C, H, N on picrate | 53.2; 3.1; 14.5* | 53.3; 3.5; 14.8 |

*Calculated, not determined.

Example VI

Into a bomb was charged 125 parts of n-butylacetylene, 75 parts acetonitrile and 2 parts potassium. The bomb was closed, cooled in solid dioxide/methanol mixture and evacuated to remove air. The bomb was then closed and heated with shaking at 180° C. for 10 hours. Upon cooling, the contents of the bomb were removed and distilled. This gave 3.5 parts of the dimethyl n-butyl pyrimidine distilling at 100°/24 mm. ($n_D^{25}$ .4872).

*Anal.*—Calcd. for $C_{10}H_{16}N_2$: C, 73.3; H, 9.8. Found: C, 73.6; H, 10.0.

This invention is broadly applicable to the preparation of pyrimidines and pyridines from acetylenes and nitriles in which the acetylenic group in the acetylene and the cyano group in the nitrile are the only reactive groups present.

It is preferred to use nitriles of the formula RCN, where R is a monovalent hydrocarbon radical which may be aliphatic, cycloaliphatic, saturated or unsaturated, or aromatic. Typical nitriles which may be used in place of those already mentioned are propionitrile, valeronitrile, cyclohexylnitrile, acrylonitrile, allyl cyanide, stearonitrile, beta-phenylethylnitrile and toluonitrile. Particularly preferred are hydrocarbon mononitriles of from two to eighteen carbon atoms and especially alkyl and aryl mononitriles.

Acetylene (CH≡CH) is the preferred monoacetyene. However, there can be used any hydrocarbon monoacetylene containing a single terminal acetylenic triple bond as the sole aliphatic unsaturation. These monoacetylenes have the formula R′C≡CH where R′ is hydrogen or a hydrocarbon radical free from aliphatic unsaturation. Particularly preferred hydrocarbon monoacetylenes have from two to eight carbon atoms, especially the alkyl monoacetylenes. Examples are methyl acetylene, butyl acetylene and phenyl acetylene.

As indicated in the examples, only a small amount of catalyst is necessary. As little as 0.1% of alkali metal based on the weight of nitrile is effective, but it is advantageous to use from 1 to 5%. Lithium can be used in place of sodium or potassium. The alkali metals can also be used in the form of their alkyl and aryl derivatives, e. g., sodium phenyl, potassium amyl, lithium butyl, and lithium phenyl.

The ratio of acetylene to nitrile can be varied greatly. When the reaction is carried out as a batch process, it is most convenient to add all the nitrile at the start of the reaction and introduce acetylene continuously or portion-wise as it is consumed. Under these conditions the nitrile is present in excess, particularly during the early stages of the reaction. Use of a high nitrile : acetylene ratio favors the formation of the pyrimidine, whereas a low nitrile : acetylene ratio favors the formation of the pyridine.

The reaction can be carried out in the liquid or gaseous phase, depending somewhat upon the boiling point of the nitrile used. Diluents for the acetylene or nitrile may be used but are unnecessary since the reaction proceeds smoothly in the preferred temperature range of 150–200° C. The reaction is preferably carried out under pressure. Necessary precautions must of course be taken when operating under pressure in view of the hazards attendant upon the use of acetylene under pressure.

The pyrimidines and pyridines formed in this process can be used for the same purposes as those made by other methods. Thus the pyrimidines can be used in making pharmaceuticals, and the pyridines can be used as solvents and as intermediates in the preparation of resins and water repellents.

As many apparently widely different embodiments of this invention may be made without departing from the spirit and scope thereof, it is to be understood that this invention is not limited to the specific embodiments thereof except as defined in the appended claims.

We claim:

1. A process for preparing a heterocyclic ring compound of the class consisting of pyrimidines and pyridines, which comprises reacting, under superatmospheric pressure at a temperature of 125° to 225° C. and in the presence of an alkali metal, a mononitrile with a monoacetylene.

2. A process for preparing a heterocyclic ring compound of the class consisting of pyrimidines and pyridines, which comprises reacting, under superatmospheric pressure at a temperature of 125° to 225° C. and in the presence of an alkali metal, a hydrocarbon mononitrile with a hydrocarbon monoacetylene containing a single terminal acetylenic triple bond as the sole aliphatic unsaturation.

3. A process for preparing a heterocyclic ring compound of the class consisting of pyrimidines and pyridines, which comprises reacting at a temperature of 125° to 225° C., under a pressure of 100 to 300 lbs./sq. in. and in the presence of an alkali metal, a hydrocarbon mononitrile with a hydrocarbon monoacetylene containing a single terminal acetylenic triple bond as the sole aliphatic unsaturation.

4. A process for preparing a heterocyclic ring compound of the class consisting of pyrimidines and pyridines, which comprises reacting at a temperature of 125° to 225° C. under a pressure of 100 to 300 lbs./sq. in. and in the presence of an alkali metal, a hydrocarbon mononitrile with acetylene.

5. A process as set forth in claim 2 wherein said hydrocarbon mononitrile is acetonitrile.

6. A process as set forth in claim 2 wherein said hydrocarbon mononitrile is benzonitrile.

7. A process as set forth in claim 2 wherein said hydrocarbon monoacetylene is acetylene.

8. A process as set forth in claim 2 wherein said alkali metal is potassium.

9. A process as set forth in claim 2 wherein said alkali metal is sodium.

10. A process for preparing a heterocyclic ring compound of the class consisting of pyrimidines and pyridines, which comprises reacting, under superatmospheric pressure at a temperature of 125 to 225° C. and in the presence of an alkali metal, an alkyl mononitrile with an alkyl monoacetylene containing a terminal acetylenic triple bond.

11. A process for preparing a heterocyclic ring compound of the class consisting of pyrimidines and pyridines, which comprises reacting, at a temperature of 125° to 225° C. under a pressure of 100 to 300 lbs./sq. in. and in the presence of an alkali metal, acetonitrile with acetylene.

12. A process as set forth in claim 11 wherein said alkali metal is potassium.

13. A process for preparing a heterocyclic ring compound of the class consisting of pyrimidines and pyridines, which comprises reacting, at a temperature of 125° to 225° C. under a pressure of 100 to 300 lbs./sq. in. and in the presence of an alkali metal, benzonitrile with acetylene.

14. A process as set forth in claim 13 wherein said alkali metal is potassium.

15. A process as set forth in claim 13 wherein said alkali metal is sodium.

JOHN C. SAUER.
WILLIAM KENNETH WILKINSON.

No references cited.